United States Patent Office
3,642,809
Patented Feb. 15, 1972

3,642,809
METHOD FOR PRODUCING 2,3,5,6-TETRA
HYDROIMIDAZO-[2,1-b]THIAZOLES
Milon Walker Bullock, Hopewell, N.J., assignor to
American Cyanamid Company, Stamford, Conn.
No Drawing. Continuation-in-part of application Ser. No.
493,231, Oct. 5, 1965. This application Mar. 27, 1968,
Ser. No. 716,353
Int. Cl. C07d 91/42, 99/10
U.S. Cl. 260—306.7     3 Claims

ABSTRACT OF THE DISCLOSURE

The preparation of phenyl tetrahydroimidazo[2,1-b]thiazoles from phenyl haloethyliminothiazolidines by cyclization with alkali, is described. These compounds are useful as anthelmintics.

---

The present application is a continuation-in-part of my copending application Ser. No. 493,231, filed Oct. 5, 1965, and now abandoned.

SUMMARY OF THE INVENTION

This invention relates to a method of preparing 6-phenyl-2,3,5,6-tetrahydroimidazo[2,1-b]thiazole.

The 6-phenyl-2,3,5,6-tetrahydroimidazo[2,1-b]thiazole prepared by the process of the present invention can be illustrated by the following formula:

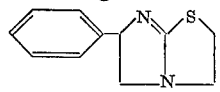

Among the intermediates directly convertible into the 2,3,5,6-tetrahydroimidazo[2,1-b]thiazoles described above are the following: 3-(β-chlorophenethyl)-2-iminothiazolidine; 3-[β-bromophenethyl)-2-iminothiazolidine; 3-[β-iodo-phenethyl]-2-iminothiazolidine.

In preparing the 6-phenyl-2,3,5,6-tetrahydroimidazo-[2,1-b]thiazole by the process of the present invention a 3-[β-halo-3-phenethyl]-2-iminothiazolidine acid addition salt is contacted with an aqueous immiscible organic solvent followed by heating with an aqueous alkaline solution to produce the free base of the dl-6-phenyl-2,3,5,6-tetrahydrotetrahydroimidazo[2,1-b]thiazole separating the organic phase and recovering the product therefrom. The reaction is usually carried out at a temperature within the range of from 40° to 120° C. for a period of from about 10 minutes to 3 hours depending upon the temperature at which the reaction is carried out. Solvents such as chloroform, ethylene chloride, ethyl acetate, etc., can be used.

The 3-(β-halophenethyl)-2-iminothiazolidines are prepared from the corresponding 2-imino-α-phenyl-3-thiazolidineethanol by reaction with thionyl chloride, phosphorus trichloride, phosphorus tribromide, phosphorus oxychloride or other agents well known to those skilled in the art for transforming alcohols to halides. The reaction is usually carried out by mixing the intermediates with the halogenating agent and heating at a temperature within range of 40° to 120° C. for 5 minutes to 4 hours.

The 2-imino-α-phenyl-3-thiazolidineethanol is prepared by contacting an α-phenyl-1-aziridineethanol with thiocyanic acid followed by treatment with a strong acid. The thiocyanic acid is usually prepared in situ by the acidification of any ammonium or metal thiocyanate salt. The 2-imino-α-phenyl-3-thiazolidineethanol can also be prepared by reacting α-phenyl-1-aziridineethanol with thiourea and a strong acid followed by heating.

The α-phenyl-1-aziridineethanol can be prepared by a reaction of styrene oxide or substituted phenyl ethyleneoxide with ethylenimine in an aqueous alkaline mixture as described by Funke et al. Bull. Soc. Chim., France, 1953 (1201–3).

The process of the present invention starting with known reactants can be illustrated by the following flowsheet.

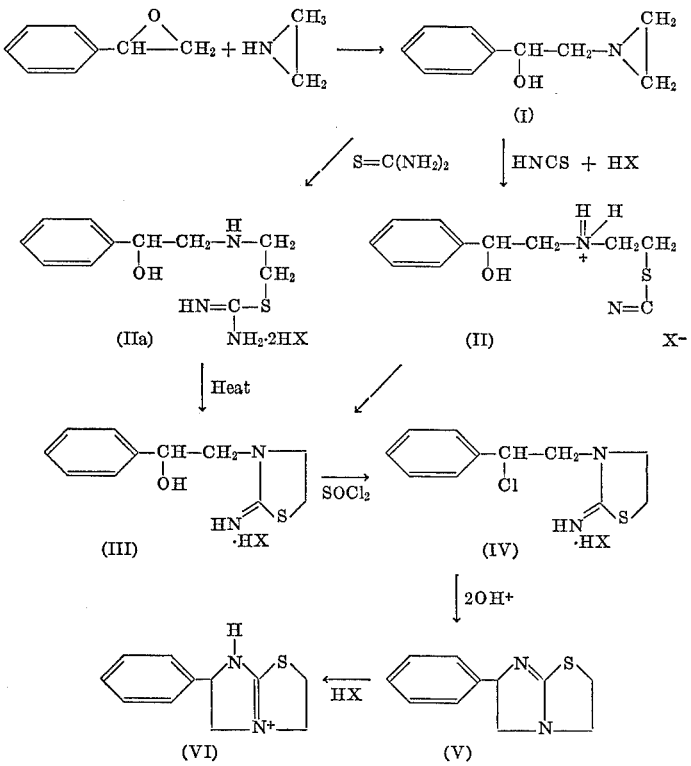

wherein X is a cation.

The preparation of Compound (I) in which R is hydrogen has been described by Funke et al. as hereinbefore described. The compound represented by Formula I can be transformed into the compound of (II) by reaction of (I) with thiocyanic acid which can be prepared by the acidification of any ammonium or metal thiocyanate salt. When the compound of (II) is heated in a mildly acidic medium, it is immediately converted to the 2-iminothiazoline compounds of (III). Compounds of (III) can also be prepared by reacting compound of (I) with thiourea and a strong acid which yields the compounds of (IIa) which can be converted further to (III) by heating in a suitable reaction medium. The compounds of (III) can be converted to the compounds of (IV) by contacting (III) with thionyl chloride or other agents such as phosphorus trichloride which are known to transform alcohols to halides. When the compounds of (IV) are contacted with a base and warmed slightly, it is transformed into the 6 - phenyl - 2,3,5,6 - tetrahydroimidazo-[2,1-b]thiazole free base represented by Formula V. If desired, the free base can be converted to salts, which are represented by Formula VI, by contacting the free base with an acid.

The use of 6-phenyl-2,3,5,6-tetrahydroimidazo[2,1-b]-thiazole for helmenthiasis is described by J. S. Remders, Netherlands J. of Vet: Sci. 91 1967 (1966).

The compounds of the present invention were tested by standard parasitological procedures for evaluating anthelmintic efficacy, i.e., (1) in most cases the "critical" test in which the number of worms eliminated in the feces following treatment is compared with the total number of worms present, i.e., the sum of those eliminated and those present at necropsy, and (2) the "controlled" test method in which the average numbers of worms present in treated animals is compared at necropsy several days after treatment with the average number present in similarly infected but untreated animals. Depending upon the host species and the particular helminth studied the infections were experimentally induced or in some cases naturally acquired. The tests showed that di-2,3,5,6-tetrahydro-6-phenyl-imidazo[2,1-b]thiazole hydrochloride and some of its analogs are highly active against a very broad spectrum of nematode parasites of mammals and birds at low dosage, and by varied routes of administration. The following table gives illustrative representative results obtained in testing the above described imidazothiazole, and is not intended to be limiting in regard to dose ranges, routes of administration, or species of nematodes. Data refer to adult helminths unless otherwise indicated.

| Host | Doses, mg./kg. (or other) | Route of administration | Approximate percent average efficacy | Species of adult [1] nematode |
|---|---|---|---|---|
| Mouse | 100 | Oral gavage | 100 | Syphasia aspiculuris. |
| Do | 25 | do | 95-100 | Nematospiroides dubius. |
| Do | 20 | Subcutaneous | 80 | Nematospiroides dubius. |
| Do | ([2]) | Drug-diet | 90 | Ascaris suum larvae. |
|  |  |  | 100 | Nematospiroides dubius. |
| Sheep | 3.75-10 | Oral drench | 100 | Haemonchus contortus. |
| Do | 3.75-10 | do | 85-99 | Nematodirus sp. |
| Do | 5-10 | do | 90-100 | Trichostronaylus axei. |
| Do | 10 | do | 94 | Ostertagia circumcincta. |
| Do | 15 | do | 100 | Ostertagia circumcincta. |
| Do | 7.5-10 | do | 95 | Trichostrongylus colubriformis and Trichstrongylus vitrinus. |
| Do | 2.5-7.5 | Subcutaneous | 100 | Haemonchus contortus. |
| Do | 5-7.5 | do | 95 | Ostertagia circumcincta. |
| Do | 2.5-7.5 | do | 99 | Trichostrongylus colubriformis and Trichostrongylus vitrinus. |
| Do | 5-7.5 | do | 97-100 | Nematodirus sp. |
| Do | 15 | Oral drench | 99 | Haemonchus contortus larvae. |
| Do | 15 | do | 99 | Trichostrougylus colubriformis larvae. |
| Do | 15 | Subcutaneous | 87 | Ostertagia circumcincta larvae. |
| Cattle | 2.5-10 | Oral drench | 100 | Haemonchus placei. |
| Do | 7.5-20 | do | 80-100 | Trichostroncylus axei. |
| Do | 7.5-20 | do | 80-100 | Ostertagi sp. |
| Do | 5-10 | do | 100 | Cooperia sp. |
| Cattle | 7.5 | do | 100 | Nematodirus sp. |
| Do | 5-10 | do | 100 | Oasophagostomum sp. |
| Do | 5-10 | Intramuscular or subcutaneous | 100 | Haemonchus placei. |
| Do | 5-20 | do | 90+ | Trichostrohnaylies axei. |
| Do | 5-20 | do | 90+ | Ostertagia sp. |
| Do | 5-10 | do | 100 | Cooperia sp. |
| Do | 5-10 | Intramuscular | 100 | Nematodirus sp. |
| Do | 5-10 | do | 100 | Oes. sp. |
| Do | 5-10 | do | 100 | Bunostomum sp. |
| Do | 7.5 | Intraperitoneal | 100 | Haemonchus placei. |
| Do | 7.5 | do | 80 | Trichostronaylus axei. |
| Do | 7.5 | do | 90 | Ostertagia sp. |
| Do | 7.5 | do | 100 | Cooperia sp. |
| Do | 7.5 | do | 100 | Nematodirus sp. |
| Do | 7.5 | do | 100 | Bunostomum sp. |
| Swine | 5 | Oral capsule or feed | 100 | Ascaris suum. |
| Do | 10 | In drinking water | 100 | Ascaris suum. |
| Do | 2.5-10 | In drinking water or oral capsule | 100 | Metastrongylus sp. |
| Do | 10-20 | In drinking water | 85 | Oasophagostomum sp. |
| Do | ([3]) | In feed continuously | 95 | Ascaris suum larvae. |
| Dog | 5 | Subcutaneous | 99 | Ancylosioma caninum. |
| Dog | 10 | Oral capsule | 90 | Toxacara canis. |
| Dog | 10 | do | 100 | Toxascaris lechnia. |
| Chicken | 80 | In drinking water | 90+ | Agcarudua galli larvae. |

[1] Unless otherwise indicated.  [2] 0.1% in feed.  [3] 0.0125% in feed.

The following examples illustrate in detail the process of preparing substituted imidazothiazoles.

DETAILED DESCRIPTION

The following examples illustrate in detail the process of the present invention.

EXAMPLE 1

Preparation of dl α-phenyl-1-aziridineethanol

To a solution of 43.0 grams (1.0 mole) of ethyleneimine and 60.0 grams (0.5 mole) of styrene oxide is added three drops of water and 0.2 gram of potassium hydroxide. The mixture is heated at reflux for 1½ hours. Distillation of the crude product gives 55.6 grams (68%) of the crystalline product. Recrystallization gives pure α-phenyl-1-aziridineethanol with melting point 74°–76° C.

EXAMPLE 2

Preparation of dl α-phenyl-1-aziridineethanol

A solution of 60.0 grams (0.5 mole) of styrene oxide, 50 ml. of ethanol, and 0.2 gram of potassium hydroxide is prepared. To this solution is added 25.9 grams (0.6 mole) of ethyleneimine in portions. The mixture is maintained at 29°–30° C. for twenty minutes, and then is heated at reflux for thirty minutes. The solvent is removed under reduced pressure to provide the crude product. Addition of petroleum ether to the residue gives 8.5 grams of product with melting point 53°–63° C. Distillation of the remaining oil gives an additional 30.7 grams of product, melting point 56–65° C., the total yield is 48%.

EXAMPLE 3

Preparation of dl 2-imino-α-thiazolidineethanol hydrochloride

To a solution of 1.17 grams (0.012 mole) of potassium thiocyanate in 10 ml. of ethanol is added 0.011 mole of hydrogen chloride in 3 ml. of ethanol. The mixture is warmed to 50° C., cooled, and the precipitated potassium chloride filtered off. The filtrate, which contains 0.011 mole of thiocyanic acid, is added to a solution of 1.63 grams (0.01 mole) of α-phenyl-1-aziridineethanol at a rate sufficient to maintain the reaction temperature at 30°–35° C. After the addition of the thiocyanic acid is complete, the product, dl 2-[(β-hydroxyphenethyl)amino]ethyl thiocyanate is treated with a solution of 0.015 mole of hydrogen chloride in 5 ml. of ethanol. Removal of the solvent at reduced pressure gives the product melting point 196–199° C., in a 95% yield. Recrystallization from ethanol provides the pure product, with melting point 198–200° C.

EXAMPLE 4

Preparation of dl 3-(β-chlorophenethyl)-2-iminothiazolidine hydrochloride

To a solution of 2.25 grams (0.009 mole) of 2-imino-α-phenyl-3-thiazolidineethanol hydrochloride in 50 ml. of chloroform is added 3 ml. of thionyl chloride. The mixture is refluxed for thirty minutes, and the solvent removed under pressure to give 1.93 grams of solid product.

EXAMPLE 5

Preparation of dl 3-(β-bromophenethyl)-2-iminothiazoline

A solution of 2-imino-α-phenyl-3-thiozolidineethanol in chloroform is treated with at least one-third molar equivalent to phosphorus tribromide. The mixture is stirred at room temperature for approximately 2½ hours and then warmed at 40–50° C. for an additional 40 minutes. The reaction mixture is poured into ice and the acid suspension made alkaline with sodium hydroxide solution. The organic layer is separated, washed with water, and dried with magnesium sulfate. Evaporation of the solvent gives the desired bromo compound.

EXAMPLE 6

Preparation of dl 6-phenyl-2,3,5,6-tetrahydroimidazo[2,1-b]thiazole

To a solution of 1.30 grams (0.005 mole) of 3-(β-chlorophenethyl)-2-iminothiazolidine hydrochloride (Example 4) in 50 ml. of chloroform is added a solution of 2.76 grams of potassium carbonate in 10 ml. of water. The mixture is heated at reflux for one hour, cooled, and the layers separated. The oragnic layer is washed with water and dried over potassium carbonate. Removal of the solvent under reduced pressure gives 1.0 grams of impure solid. Crystallization from ether gives the pure product, melting point 90°–92° C.

EXAMPLE 7

When the procedure described in Example 6 is carried out starting with 3-(β-bromophenethyl)-2-iminothiazolidine (Example 5), the product dl-6-phenyl-2,3,5,6-tetrahydroimidazo-[2,1-b]thiazole is obtained.

EXAMPLE 8

Preparation of dl 6-phenyl-2,3,5,6-tetrahydroimidazo[2,1-b]thiazolium chloride

To a solution of 6-phenyl-2,3,5,6-tetrahydroimidazo-[2,1-b]thiazole in isopropanol is added a solution of hydrogen chloride in isopropanol. The precipitated hydrochloride is filtered, and washed consecutively with ethanol and ether. The crystalline product has melting point 261°–262° C. with decomposition.

EXAMPLE 9

Preparation of dl 2-imino-α-phenyl-3-thiazolidineethanol hydrochloride

When α-phenyl-1-aziridineethanol is mixed with a stoichiometric quantity of thiourea in the presence of of hydrochloric acid, the product obtained is dl 2{2[(β-hydroxyphenylethyl)amino]ethyl} - 2 - thiopseudourea. The latter product on heating in chloroform produces the product.

I claim:

1. A process which comprises contacting an aqueous immiscible organic solution of an acid addition salt of a compound of the formula:

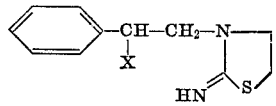

wherein X is halogen, with an aqueous alkaline solution, heating the mixture at a temperature within the range of 40° to 120° C. to cause the formation of the free base of the dl 6-phenyl-2,3,5,6-tetrahydroimidazo[2,1-b]thiazole, separating the immiscible organic phase and recovering said product therefrom.

2. A process according to claim 1, wherein X is chlorine.

3. A process according to claim 1, wherein X is bromine.

References Cited

UNITED STATES PATENTS 3,274,209  9/1966  Raeymaekers et al. __ 260—306.7

FOREIGN PATENTS 34,860  12/1964  Germany _____ 260—306.7

ALTON D. ROLLINS, Primary Examiner

U.S. Cl. X.R.

260—239 E; 424—270

UNITED STATES PATENT OFFICE
CERTIFICATE OF CORRECTION

Patent No. 3,642,809    Dated February 15, 1972

Inventor(s) Milon Walker Bullock

It is certified that error appears in the above-identified patent and that said Letters Patent are hereby corrected as shown below:

Column 2 in the FLOWSHEET, please change Formula (II) from "

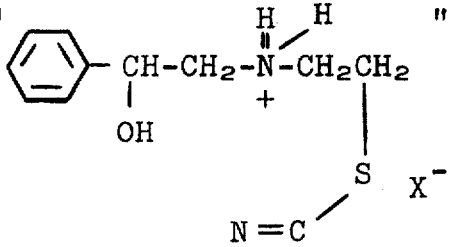

(II)                                                    to read

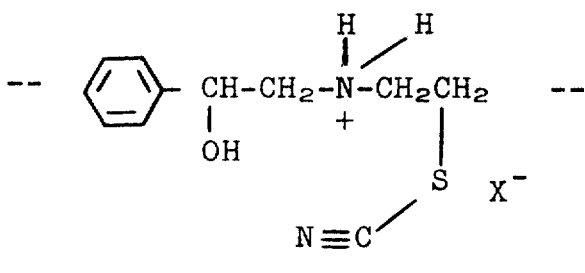

(II)

Column 5, Example 3, please change the title from "Preparation of dl 2-imino-α-thiazolidineethanol hydrochloride" to read -- Preparation of dl 2-imino-α-phenyl-3-thiazolidine-ethanol hydrochloride --

Signed and sealed this 27th day of June 1972.

(SEAL)
Attest:

EDWARD M. FLETCHER, JR.
Attesting Officer

ROBERT GOTTSCHALK
Commissioner of Patents